Patented Mar. 4, 1941

2,233,835

UNITED STATES PATENT OFFICE 2,233,835

MANUFACTURE OF HALOGENATED ORGANIC ACIDS CONTAINING THREE CARBON ATOMS AND DERIVATIVES THEREOF

John William Croom Crawford, Frodsham, and Nancy McLeish, Runcorn, England, assignors to Imperial Chemical Industries Limited, a corporation of Great Britain No Drawing. Application October 19, 1938, Serial No. 235,900. In Great Britain October 26, 1937

24 Claims. (Cl. 260—486)

This invention relates to the manufacture of organic acids and metal salts and esters thereof, and more particularly to the manufacture of α-chloracrylic acid and metal salts and esters thereof.

The reaction between formaldehyde and di- tri- and tetrachlorethylene respectively, in the presence of concentrated sulphuric acid has been studied by Prins (Rec. Trav. Chim. 51, 469, 1932). He found that addition of paraformaldehyde to a mixture of trichlorethylene and concentrated sulphuric acid at somewhat elevated temperatures caused some evolution of hydrochloric acid and that on pouring the product into water with cooling, extracting with ether and evaporating off the ether from the extract, a syrupy liquid was obtained from which a crystalline acid believed to be the ether-acid $(O(CH_2.CHCl.COOH)_2)$ was isolated. It was stated that if the concentrated acid were replaced by acid of 80% strength, no reaction occurred.

This invention has as an object to devise a new method of manufacturing organic acids and salts and esters thereof. A further object is to devise a new method of manufacturing α-chloracrylic acid, chlorhydracrylic acids and α,β-dichloropropionic acid their esters and salts. A further object is to provide new esters and halides of α-chloracrylic acid. Further objects will appear hereinafter. These objects are accomplished by the following invention.

We have found that organic acids and salts and esters thereof can be prepared by a process which includes the steps of reacting formaldehyde or a polymer thereof with trichlorethylene in the presence of sulphuric acid of at least 80% strength and subsequently heating the reaction mixture in the presence of water and/or an alcohol. Preferably the formaldehyde or its polymer is reacted under agitation and at a somewhat elevated temperature with a mixture containing the trichlorethylene and the sulphuric acid and the subsequent heating is effected under such conditions that at least one part by weight of water is present for each ten parts by weight of 100% sulphuric acid.

Thus one method of carrying out the reaction between the trichlorethylene and the formaldehyde or its equivalent is to mix the former with, e. g. 90–95% or even 100% sulphuric acid, and then to add gradually powdered paraformaldehyde or trioxymethylene or to pass in a stream of gaseous formaldehyde while stirring and maintaining the temperature somewhat above normal, e. g. 40° C. Temperatures as low as 30° C. may, however, be used satisfactorily. At temperatures much above 40° C. the reaction is vigorous and on this account and because of the exothermic nature of the reaction higher temperatures should be avoided at least during the early stages of the reaction. Higher temperatures, e. g. 50–70° C. or even 100° C. may be used during the later stages to ensure that the reaction is complete.

The proportion of sulphuric acid to trichlorethylene should be between 1½ and 4 mols and preferably between 2 and 3 mols of the 100% acid per mol of trichlorethylene and while there appears to be nothing critical in the ratio of formaldehyde or its equivalent to the trichlorethylene, we prefer to use rather more than one mol of HCHO to each mol of $C_2HCl_3$ and suitably between 1 and 1½ mols. The primary chemical change during the reaction appears to be the addition of the $CH_2O$ molecule at the double bond of the $CHCl:CCl_2$, and thus if less than one mol of formaldehyde is added, not all of the trichlorethylene will react, while quantities much greater than those given above are unnecessary to achieve that result.

We have found however that a preferable method of carrying out the first step of our invention is to add along with the formaldehyde, trioxymethylene or paraformaldehyde an amount of water equivalent to at least one mol per mol of HCHO. Thus 40% formalin or an aqueous paste of paraformaldehyde with the appropriate amount of water may be used. The desirable molar ratios of formaldehyde, trichlorethylene and sulphuric acid are not modified when water is added with the formaldehyde, but it should be observed that the formaldehyde does not appear to react with the trichlorethylene, if the concentration of the sulphuric acid falls below 80%. Thus where water is to be introduced with the formaldehyde, the acid should initially be stronger than 80% and should be present in such quantities that the acid concentration does not fall below this value for the reaction of the formaldehyde with the trichlorethylene. When carrying out the reaction in this manner, temperatures down to 30° C. are still satisfactory in the initial stages when not more than about 1 mol of water per mol of formaldehyde is used, though with more water, temperatures of the order of 40–50° C. are preferable.

A convenient way of carrying out this form of the invention is to add the aqueous formaldehyde to the mixture of trichlorethylene and sulphuric acid contained in an apparatus fitted with a reflux condenser, since on account of the heat evolved and particularly when temperatures of the order of 50–70° C. are employed loss of trichlorethylene through evaporation would otherwise occur. As the formalin or its equivalent is gradually added, hydrogen chloride is evolved, and the frequency and magnitude of the additions should be regulated to ensure a smooth steady reaction. When the last addition has been made, the temperature may be increased gradually up to about 70° C. or even to 100° C: to ensure that the reaction is completed; when, as we prefer, sufficient formaldehyde is used to react with all the trichlorethylene, this will be indicated by the fact that refluxing of the trichlorethylene ceases. Should the process be carried out using an excess of trichlorethylene, this criterion will not be available, but the reaction may be judged complete when, under steady temperature conditions, the refluxing does not diminish.

Hydrogen chloride is evolved during the reaction and the cessation of this may also be used as an indication that the reaction is complete. Owing to the high vapor pressure of the trichlorethylene at the temperatures of the reflux condenser, it is preferable to scrub this effluent hydrogen chloride with water; trichlorethylene vapor present therein is thus condensed, and may be separated and returned to the reaction vessel. Alternatively, the gases may be passed through a condenser maintained at e. g. −40 to −60° C. whereby trichlorethylene vapor is condensed out.

Another method of carrying out the reaction when formalin is to be used is to mix a part of the formalin with oleum, e. g. 20% oleum, so that the latter is converted to 100% $H_2SO_4$, then to add the trichlorethylene and carry out the reaction by adding the remainder of the formalin as in the methods described above. Part of the trichlorethylene equivalent to the formaldehyde present in the formalin may also be mixed with the oleum at the same time.

At the stage of the process where the reaction between the trichlorethylene and the formaldehyde is complete, there appears to be present in the reaction mixture an organic compound of the type $R.CH_2.HSO_4$, possibly the compound $COCl—CHCl—CH_2.HSO_4$. The further heating step which is carried out in accordance with our invention may be merely gentle enough to convert the —COCl group into an acid or an ester group according to whether water only is present or an alcohol is added prior to the heating, the —$CH_2HSO_4$ grouping under gentle heating being for the most part unattacked. Preferably, however, the heating is strong enough to cause a molecule of $H_2SO_4$ to split off, leading to the formation of a hydroxy acid, an unsaturated acid, or esters of such acids according to the particular condition under which heating takes place.

The gentle heating with water or alcohol may be carried out at as low a temperature as 60° C. and for as short a time as 15 minutes, though, usually, such a short time is only to be preferred with the stronger heating at higher temperatures. At temperatures but little above 60° C., e. g. 65° C., it is desirable to have a longer heating, e. g. 2 hours or more.

Thus esters containing chlorine can be obtained directly by adding an alcohol to the formaldehyde-trichlorethylene-sulphuric acid reaction mixture, and heating for 2 hours to 60–80° C. under reflux if necessary, depending on the alcohol. After cooling the esters are obtained by extracting with ethyl ether or petroleum ether or by distillation under reduced pressures. The esters produced may also be isolated by pouring the esterified reaction mixture into water, and distilling under reduced pressure, the lower of the two layers which are formed. In such cases the extraction or distillation process isolates some esters containing chlorine, carbon, hydrogen and oxygen, while the majority of the product is left behind as a sulphur-containing ester of unidentified constitution.

Alternatively, in the preferred form of the invention, in which the reaction mixture is heated to somewhat higher temperatures, i. e. above 80° C. up to the boiling point of the mixture, substantially all of the product obtained will consist of sulphur-free compounds, the composition of which will depend on the amount of water which is present during the heating step. If the amount of water present is at least 1.5 and preferably at least 1.85 times the weight of $H_2SO_4$ used, chlorohydracrylic acid is produced. If the amount of water is less than 1.5 times the weight of $H_2SO_4$ and is preferably between 0.1 and 1.0 times its weight, then α-chloracrylic compounds mainly result. In working with an amount of water in the neighbourhood of 1.5 times the weight of the $H_2SO_4$ both acids may be formed. In such a case a separation can be effected by steam distillation, the α-chloracrylic acid being volatile in steam whereas chlorohydracrylic acid is not.

Consequently, if chlorohydracrylic acid is to be prepared an amount of water must be added to the reaction mixture from the first step of the process such that the amount present during the heating is at least 1.5 times the weight of the $H_2SO_4$ which has been used. An amount of between 2.0 and 2.5 times the weight is very suitable, but we find that it is not desirable to have present more than about nine times the weight of the $H_2SO_4$. It will be evident of course that the precise amount of the water added at this stage will be dependent on the amount added initially with the formaldehyde and/or sulphuric acid. The limiting values which are set out above are to be applied to the total water content. After adding the water, the mixture is then heated for a time, e. g. boiled for 2–3 hours, after which the chlorohydracrylic acid can be removed by extracting the cooled mixture with a solvent such as ether or petrol ether, and isolated by evaporating off the solvent from the filtered extract. If desired the reaction mixture may be steam distilled before extraction to remove any α-chloracrylic acid which may be present; it may also be saturated with sodium chloride before extraction whereby a more efficient recovery of the acid can be obtained.

The chlorohydracrylic acid thus produced, $CH_2OH.CHCl.COOH$, can be esterified by heating with an alcohol, preferably in the presence of an esterifying catalyst, or it may be converted to α-chloracrylic acid by distillation in the presence of a dehydrating agent such as sulphuric acid of at least 50% concentration, strong phosphoric acid or zinc chloride.

Alternatively, when α-chloracrylic acid or one of its esters is to be prepared the heating step is carried out in the presence of an amount of water less than 1.5 times the weight of the $H_2SO_4$ used. Preferably the amount of water is between 0.1 and 1.0 times the weight of $H_2SO_4$ and the heating is carried out at 120° C. to 160° C. for between 15 minutes and 3 hours, suitably from a half to 2 hours. As in the preparation of chlorohydracrylic acid, the precise amount of water added at this stage will depend on the amount which was present during the first step of the process. It will be evident that in some circumstances the addition of a further amount of water will not be necessary. After adding any water that may be required, the mixture is heated rapidly to between 120° C. and 160° C. and maintained at that temperature for say half an hour, whereupon the α-chloracrylic acid can be recovered as such, e. g. by steam distillation, or by extraction with a solvent such as ethyl ether or petroleum ether. If steam distillation is used, it may be found desirable first to dilute the mixture with water in order to avoid excessive heating on introduction of the steam. Alternatively, an ester of α-chloracrylic acid can be obtained by carrying out the heating step in the presence of a suitable alcohol and the appropriate amount of water for the preparation of α-chloracrylic acid. In this form of the invention the mixture is heated under reflux for a short time to esterify the acid and then the ester recovered from the reaction mixture, e. g. by extraction with a solvent, or preferably by steam distillation. The ester may also be recovered by pouring the product into a large quantity of water, when the ester layer may be separated off and purified. Usually it contains a small proportion of free acid which may be washed out with aqueous alkali metal carbonate. After drying a pure ester is then obtained by distillation leaving behind as a residue some dichloropropionate presumably formed by the addition of HCl to the double bond of the chloracrylic acid molecule. The dichlorpropionate can be converted to chloracrylate.

Esters of α-chloracrylic acid can also be obtained by the addition of suitable alcohols to the crude reaction mixture obtained by the heating step and again heating under reflux or they may also be made by esterifying the recovered acid.

In the preparation of α-chloracrylic acid we have also found that it is possible to combine the heating step and the addition of water by passing steam into the reaction mixture, and also to combine this operation with the steam distillation method of recovering the acid by directly steam distilling the reaction mixture. In the initial stages the necessary high temperature is reached while there is still but a limited amount of water present, because of the heat of dilution of the sulphuric acid and the total heat of the steam, and with continued introduction of steam the steam distillation of the α-chloracrylic acid produced is effected.

In any of the above variations of our invention leading to the formation of esters the alcohol should be added to the mixture containing the acid to be esterified in the ratio of between one and two mols of alcohol per mol of acid to be treated, the amount of the latter being determined by assuming that there is one mol of acid for every mol of trichlorethylene reacted with formaldehyde. A short heating of the acid-containing mixture with the alcohol suffices to esterify the former since the sulphuric acid present will act as an esterification catalyst. In the case of the more volatile alcohols, it is desirable to perform the heating in a vessel fitted with a reflux condenser. We find it preferable to avoid performing the esterification in the presence of very strong sulphuric acid, i. e. when there are more than 4 parts by weight of $H_2SO_4$ for each part of $H_2O$ since under such circumstances part of the alcohol may be converted to ether; this difficulty may be avoided by adding when necessary a suitable amount of water with the alcohol. When water is added under such circumstances it should not, of course, be in such quantity as to make the total weight of water present greater than that of the sulphuric acid.

Alcohols which may be used in our invention include methyl, ethyl, propyl, isopropyl, n-butyl, secondary butyl and n-amyl alcohols; however the invention is not limited to the use of these or other aliphatic alcohols, for we may also use aralkyl alcohols such as benzyl alcohol and β-phenyl ethyl alcohol and cyclic alcohols such as cyclohexanol and methyl cyclohexanol.

In addition to the preparation of the acids and esters, we may also prepare metallic salts of the α-chloracrylic or chlorohydracrylic acids by treating the crude acid with an oxide, hydroxide or carbonate of the corresponding metal, e. g. the oxides, hydroxides or carbonate of sodium, potassium, lithium, barium, strontium, calcium, magnesium, iron, copper, lead, zinc, mercury. The salts may also be prepared by treating with such materials a solution of the acid obtained on steam distillation, or on solvent extraction of the crude reaction product.

We have also found that during the reaction and the subsequent steps leading to the formation of α-chloracrylic acid and its esters it is desirable to have present small proportions, e. g. 0.5–1% of a material known to have the power of inhibiting the polymerisation of α-β-unsaturated aliphatic acids and their derivatives. Such materials include resorcinol, hydroquinone, pyrogallol, copper, sulphur and tannic acid.

The α-chloracrylic acid and its esters and salts which can be obtained by the process of our invention may be used for the manufacture of moulding compositions and the like by polymerising them in the presence of a filler and/or plasticizing agent.

The following examples illustrate but do not limit our invention, all parts being by weight.

*Example I*

A mixture of 30 parts of paraformaldehyde and 16.5 parts of water was added gradually during the period of three hours to a stirred mixture of 132 parts of trichlorethylene and 100 parts of 98% sulphuric acid, and the temperature being maintained at 40–50° C. After addition of the paraformaldehyde was complete, stirring was continued at the same temperature for a further period of four hours. Hydrochloric acid was evolved during the addition of the paraformaldehyde and also to some extent during the succeeding period. 64 parts of methyl alcohol were then added to the mixture which was heated for two hours under a reflux condenser.

The product was next poured into twice its volume of water and the lower layer separated and distilled at a pressure of 20 mm. of mercury when the following fractions were obtained:

|  | Parts |
|---|---|
| (1) Up to 100° C | 3 |
| (2) 100–110° C | 4 |
| (3) 115–180° C | 20 |

On re-distilling the third fraction the greater part distilled over between 168 and 173° C. under similar pressure conditions, and the re-distilled material analysed as follows:

| | Per cent |
|---|---|
| C | 36 |
| H | 4.6 |
| Cl | 28.8 |
| O by difference | 30.6 |

This corresponds to the formula $C_{10}H_{16}Cl_3O_7$.

Example II 132 parts of trichlorethylene and 184 parts of 98% sulphuric acid were mixed in a vessel fitted with thermometer, stirrers and reflux condenser. To this mixture, maintained at about 45° C. a paste of 30 parts of paraformaldehyde and 18 parts of water was gradually added and the mixture was stirred until the evolution of hydrogen chloride ceased. The product was poured into 180 parts of water and steam distilled until the distillate coming over was only faintly acid; during the distillation the temperature reached 160° C. The distillate was neutralised by warming with barium carbonate. Excess of the latter was filtered off and the solution cooled, when crystals separated out. These were removed and a further crop of crystals was produced by adding methanol to the mother liquor. In all, a yield of 105 parts of the crystals was obtained.

A sample of the recrystallised salt was found to lose 5.9% of its weight of water when heated to 135° C. and the hydrated salt analysed as follows:

| | C | H* | Cl | $H_2O$ |
|---|---|---|---|---|
| Found | 19.6 | 1.0 | 20.7 | 5.9 |
| Calculated from barium chloracrylate monohydrate | 19.6 | 1.1 | 19.4 | 5.0 |

*Excluding hydrogen in the water of crystallisation.

Example III 132 parts of trichlorethylene were reacted with a paste of 30 parts of paraformaldehyde and 18 parts of water in the presence of 184 parts of 98% sulphuric acid in a similar manner to that described in Example I. The reaction mixture was poured into 180 parts of water and the whole steam distilled, until the distillate coming over was no longer acid. The distillate was extracted with three lots of ether and the combined extracts were dried over anhydrous sodium sulphate. The ether was then distilled off and the residue was dried in vacuo. A mass of shining colorless crystals of α-chloracrylic acid was thus obtained weighing 60 parts. After recrystallisation from petroleum ether the product melted at 64–65° C. and was found to have an equivalent weight of 110.7.

Example IV

A mixture of 132 parts of trichlorethylene, 276 parts of 98% sulphuric acid and 0.2 part of hydroquinine was heated with stirring in a vessel fitted with a reflux condenser, and 75 parts of 40% formalin were gradually added. Brisk evolution of hydrogen chloride occurred with refluxing of the trichlorethylene; the temperature was kept at about 70° C. during the addition of the formalin. When all the latter had been added the temperature was raised to 95–100° C. until refluxing of trichlorethylene ceased. Steam was then blown into the mixture and the temperature rose to a maximum of 175° C. Steam distillation was carried out until the distillate coming over was only slightly acid. The distillate consisting of water and a heavy oil was then neutralised with caustic soda whereupon the oil dissolved. The mixture was then reacidified with hydrochloric acid and extracted with ether. The ether was distilled off from the extract leaving a residue consisting of a liquid and a small proportion of solid. The liquid was poured off and allowed to cool in a vacuum desiccator when crystallisation took place giving 59 parts of crystalline alpha-chloracrylic acid analysing as 96% pure. The solid from which the liquid separated was polymerised chloracrylic acid, and weighed 8 parts.

Example V

A mixture of 275 parts of 98% sulphuric acid, 1 part of resorcinol and 132 parts of trichlorethylene was stirred and treated with 75 parts of 40% formalin, the latter being added at such a rate as to maintain the temperature of the mixture between 70° and 80° C. When all the formalin had been added the reaction mixture was heated to 90–100° C. until refluxing of trichlorethylene ceased. After cooling 47 parts of methanol were added and the mixture was heated again to 90–100° C. under reflux for about 15 minutes and then steam distilled as long as an oily distillate was obtained. A lower layer of crude methyl chloracrylate was separated off from the distillate, washed with dilute aqueous sodium carbonate and dried over anhydrous sodium sulphate. 35 parts of ester were thus obtained.

Example VI 184 parts of 98% sulphuric acid were mixed with and stirred with 130 parts of trichlorethylene and 1 part of resorcinol and the mixture heated to 70° C. 75 parts of 40% formalin were then added gradually so that a steady stream of hydrogen chloride was evolved while the temperature was maintained between 70 and 80° C. After addition of the last of the formalin, refluxing of the trichlorethylene diminished and the temperature was gradually raised to 100° C. until evolution of hydrogen chloride ceased. The temperature of the mixture was then quickly raised to 140° C. and there maintained for about half an hour. The mixture was then cooled to 50° C. 64 parts of methanol were quickly added and the mixture was heated under reflux for about an hour at 90–100° C. The ester was isolated by steam distillation, washed with dilute aqueous sodium carbonate and dried. 51 parts of methyl α-chloracrylate were thus obtained, boiling at 88.5° C. at a pressure of 215 mm. of mercury. A fraction boiling at 25–28° C. at a pressure of 23 mm. of mercury had a refractive index $$n_D^{19} = 1.4452$$

and density $$d_{19}^{19} = 1.213 \text{ gr./ml.}$$

Example VII 30 parts of powdered paraformaldhyde were gradually added to a mixture of 132 parts of trichlorethylene, 184 parts of concentrated (98%) sulphuric acid and 1 part of copper powder maintained at 25–30° C. After 1½ hours when the whole of the paraformaldehyde had been added the mixture was heated to 45° C. and this temperature was maintained for about an hour, by which time evolution of gas had ceased. The mixture was then steam distilled until the liquid distilling over was only slightly acid. The distillate divided on standing into an oily lower layer and an aqueous layer, the two were separated by decantation. The lower layer weighed 11 parts; 56 parts of crystalline α-chloracrylic acid were isolated from the aqueous layer by extracting with ether and evaporating the ether from the ethereal extract.

Example VIII 30 parts of paraformaldehyde were reacted with 132 parts of trichlorethylene in the presence of 184 parts of (98%) sulphuric acid and 1 part of copper as described in Example VII. When evolution of gas was complete 48 parts of methanol were added, the temperature being kept below 55° C. until the alcohol had been added; the mixture was heated under reflux at 90–95° C. for 1½ hours and then steam distilled. The distillate resolved into an aqueous layer and a lower oily layer. The latter was separated from the distillate neutralised with alkali and washed with water. It weighed 38 parts. On fractional distillation 17.5 parts of methyl α-chloracrylate (b. p. 28.5°–32° C. at 18.7 mm. mercury) were obtained.

Example IX 184 parts of 98% sulphuric acid were mixed with 130 parts of trichlorethylene in a vessel fitted with a thermometer, stirrer and reflux condenser. To the mixture was gradually added a paste of 18 parts of water and 30 parts of paraformaldehyde, the temperature being maintained at 25–35° C. Hydrogen chloride was evolved. When all the paraformaldehyde was added the temperature was raised to 40–50° C. for an hour or more until evolution of gas ceased. The reaction mixture was then poured into 300 parts of water and heated to 100° C. for 3 hours.

The resulting homogeneous liquid was cooled, saturated with sodium chloride and extracted with ether, after which the ether was evaporated off from the ethereal extract. 60 parts of a syrupy liquid were thus obtained which had an equivalent weight 129. On esterification with ethyl alcohol a colourless liquid was obtained boiling over the range 208–218° C. and having the percentage composition shown in the following table:

| | Percentage composition of esterified product | Percentage composition calculated for $CH_2OH\cdot CHCl\cdot COOC_2H_5$ |
|---|---|---|
| C | 38.7 | 39.3 |
| H | 5.5 | 5.9 |
| Cl | 23.3 | 23.3 |
| O (by difference) | 32.5 | 31.5 |
| | 100.0 | 100.0 |

Example X

The reaction was carried out in a vessel fitted with a water-cooled reflux condenser, a mechanical stirrer and an inlet for the formalin. From the top of the reflux condenser was a connection to a packed water-cooled tower adapted to scrub the evolved gas with water. The water from the tower was led to a separator designed for the recovery of trichlorethylene for return to the reaction vessel.

1381 parts of 98% sulphuric acid, 5 parts of cupric oxide and 650 parts of trichlorethylene were put in the reaction vessel and the mixture heated externally to 70° C. with stirring. Heating was then interrupted and 420 parts of formalin containing 40% HCHO were added gradually so that the temperature was maintained at approximately 70° C. When all the formalin had been added heat was again applied to cause steady refluxing of unreacted trichlorethylene. As the trichlorethylene reacted the temperature was gradually raised and at 100–110° C. refluxing ceased.

The temperature of that mixture was now quickly raised to 140° C. and maintained at that value for 30 mins. and then lowered by cooling to 100° C. 225 parts of water and 318 parts of methyl alcohol were then added and the temperature kept at 100° C. for an hour. The reflux condenser fitting was then replaced by one permitting distillation, and the mixture was steam distilled until the condensate was almost entirely water, the distillate being collected in a receiver containing a little tannic acid. During the distillation the temperature rose quickly to 110° C. and then slowly to 125° C.

The distillate settled into a lower ester layer and an upper water layer. The lower layer was run off, washed with sodium carbonate solution and dried over a small amount of anhydrous sodium sulphate and a trace of tannic acid. 440 parts of crude methyl α-chloracrylate were thus obtained. 420 parts of this ester were distilled through a fractionation column under reduced pressure when there were obtained 10 parts of moist esters, 330 parts of pure ester b. p. 35–38°/23 mm. leaving 80 parts of residue.

1464 grams of this residue were redistilled under reduced pressure through a 30″ Vigreux fractionation column and the following fractions were obtained:

(1) 47° C./27.5 mm. to 60° C./25 mm. 81 grams methyl α-chloracrylate
(2) 61° C./22.5 mm. to 70° C./22.3 mm. 300 grams mainly methyl-α,β-dichlorpropionate
(3) 70° C./22.5 mm. 75° C./21.5 mm. 923 grams methyl-α,β-dichlorpropionate Fractions 2 and 3 were further fractionated to give methyl-α,β-dichlorpropionate b. p. 67.5–68°/18 mm. Specific gravity $$d_{23}^{23}=1.318 \text{ and } n_D^{23}=1.4514$$

It was a colourless pleasant smelling liquid.

In this example in place of the cupric oxide used as antipolymerising catalyst we could have used sulphur, and instead of adding water and methyl alcohol separately we could have mixed them and added the mixture.

Example XI

Formalin was reacted with trichlorethylene and the mixture reacted with methanol and water in the same manner and quantities as described in Example X. The crude product was then gradually introduced into the upper part of a packed tower up which a current of steam was blown, and steam and volatile products from the top of the tower were condensed. Two layers were formed, the lower one of which was run off, washed with sodium carbonate and dried. It then weighed 260 parts. 251 parts of this on distillation under reduced pressure yielded 10 parts of moist ester, 153 parts of pure ester and 85 parts of high boiling residue.

Example XII

Using the apparatus described in Example X, 650 parts of trichlorethylene were reacted with 420 parts of 40% formalin in the presence of 1381 parts of sulphuric acid and 5 parts of cupric oxide as described in that example, reaction being brought to completion by raising the temperature ultimately to 120° C. The reflux condenser was then replaced by a fitting permitting steam distillation and the mixture was steam distilled until the distillate coming over was but slightly acid and the distillate was collected in a receiver containing a small amount of tannic acid. Heat evolution caused the temperature to rise to 160° C.

The distillate separated into two layers; an upper aqueous layer found on analysis to contain 189 parts of α-chloracrylic acid and 10 parts of hydrogen chloride, and the lower layer consisted essentially of 142 parts of α-chloracrylic acid dissolved in 57 parts of methyl α-chloracrylate, presumably formed by esterification of the acid with methanol present in the technical grade of the formalin used.

An aliquot part of the mixed distillate containing 177 parts of α-chloracrylic acid was redistilled under reduced pressure in a vessel fitted with a packed fractionation column and a dephlegmator and the distillate collected in an ice-cold receiver. Water and methyl α-chloracrylate was thereby distilled off and solid α-chloracrylic acid crystallised out in the distillation vessel and fractionation column. The latter was collected and weighed 174.2 parts; it was substantially anhydrous. On redistilling under reduced pressure pure α-chloracrylic acid passed over at 85–95° C./74 mm. and solidified in the receiver as a mass of white crystals.

This product was then recrystallised from petroleum ether, and 120 parts were dissolved in 100 parts of water. To this solution 75 parts of powdered calcium carbonate were gradually added with stirring, more water being added from time to time to dissolve precipitated calcium α-chloroacrylate; 500 parts were required for this purpose. The mixture was warmed to 70° C. filtered from excess carbonate and the filtrate evaporated under reduced pressure. The crop of crystals thus obtained was filtered off and dried; it weighed 149 parts on analysis the following data were obtained:

|  | C | H | Cl | Ca |
|---|---|---|---|---|
| Found | 26.5 | 2.6 | 26.0 | Percent 14.4 |
| Calculated for $(C_3H_2ClO_2)_2CaH_2O$ | 26.8 | 2.2 | 26.4 | 14.9 |

A further portion of the recrystallised acid was dissolved in water, neutralised with ammonium carbonate and evaporated under reduced pressure. A white crystalline salt was thus obtained having the following analysis:

|  | C | H | Cl |
|---|---|---|---|
| Found | 29.9 | 5.2 | Percent 28.6 |
| Calculated for $C_3H_6ClNO_2$ | 29.2 | 4.9 | 28.7 |

A further 60 parts of the recrystallised α-chloracrylic acid were mixed with 140 parts of benzoyl chloride and 0.25 part of antimony pentachloride in a flask fitted with a fractionation column and condenser. The flask was heated in an oil bath. Hydrogen chloride was evolved and 25 parts of a colourless distillate were collected. On redistilling this, 12 parts of α-chloracrylyl chloride were obtained boiling at 104–5° C./760 mm. It was a highly refractive liquid possessing a penetrating odour and marked lachrymatory power.

On analysis the following results were obtained:

|  | C | H | Cl |
|---|---|---|---|
| Found | 28.0 | 1.7 | Percent 56.6 |
| Calculated for $CH_2:CCl.COCl$ | 28.8 | 1.6 | 56.8 |

*Example XIII*

184 parts of 98% sulphuric acid, 132 parts of trichlorethylene and 1 part of copper powder were mixed and reacted at 65–75° C. with 84 parts of 40% formalin in a vessel fitted with a reflux condenser, reaction being completed by heating ultimately to 100° C. The temperature was then increased to 140–160° C. and maintained between those limits for an hour. The mixture was thereupon cooled, poured onto ice and diluted with water. The solution was extracted once with ether and the ether evaporated from the extract, leaving 35 parts of α-chloracrylic acid. Further quantities of the acid could have been obtained on further extraction.

*Example XIV*

396 parts of trichlorethylene were mixed with 830 parts of 98% sulphuric acid and 1 part of precipitated copper and then reacted with 252 parts of 40% formalin, by adding the latter at intervals over 1½ hours while maintaining a temperature of 50–60° C. The mixture was then stirred for 1¼ hours and heated gradually to 140° C. and maintained at that temperature for ½ an hour. After cooling to 100° C. 130 parts of water and then 238 parts of ethyl alcohol were added and the mixture heated for an hour to 100–115° C. and steam distilled. The distillate was collected in a receiver containing a trace of hydroquinone and on standing separated into two layers, the lower of which after washing with aqueous sodium carbonate comprised 275 parts of crude ethyl-α-chloracrylate. This was distilled under reduced pressure at 41–43° C./20 mms. The purified ester had a density $$d_{20}^{20}=1.1404$$

and a refractive index of $$n_D^{20}=1.4392$$

*Example XV* n-Propyl-α-chloracrylate was prepared by the method described in Example XIV by using 361 parts of n-propyl alcohol instead of the 238 parts of ethyl alcohol. 370 parts of neutral ester were thus obtained which on distillation boiled at 54–56° C./20 mm. The purified ester had a density of $$d_{20}^{20}=1.0852$$

and a refractive index $$n_D^{20}=1.4382$$

*Example XVI*

Isopropyl-α-chloracrylate was prepared by the method described in Example XIV using 360 parts of isopropyl alcohol in place of the 238 parts of ethyl alcohol. 240 parts of neutral ester were obtained which on distillation under reduced pressure boiled at 48–49° C./20 mm. had a density $$d_{20}^{20} = 1.0883$$

and a refractive index $$n_D^{20} = 1.4348$$

The chloroacrylic esters have not previously been described. They are colorless liquids, generally heavier than water, and possess odours which are strongly reminiscent of the methacrylates, the methyl and ethyl esters, particularly the former, have in addition a strong irritant action on the mucous membrane and are powerful lachrymators. The methyl ester at least has a marked toxic action when present as vapour in air, and the liquid irritates the skin when brought in contact with it.

*Example XVII* n-Butyl-α-chloracrylate was prepared as in Example XIV, using 406 parts of n-butyl alcohol instead of the ethyl alcohol. The ester boiled at 70–71° C./20 mm.

*Example XVIII*

75 parts of 40% formalin, 128 parts of trichlorethylene and 5 parts of copper oxide were put in an apparatus such as that described in Example X. 875 parts of 20% oleum were then added to the cooled mixture at intervals over about two hours the oleum being thus converted to sulphuric acid, a further 528 parts of trichlorethylene were then added, and after heating to 70° C. a further 342 parts of formalin were gradually added and reaction proceeded in the usual way. After reaction was complete the mixture was heated to 140° C. for 30 minutes and then treated with water and methanol as described in Example X and the ester steam distilled off as there described. 412 parts of crude neutral ester were thus obtained, and on distilling 390 parts of this crude ester under reduced pressure after drying with anhydrous sodium sulphate 297 parts of pure ester were obtained, leaving 79 parts of a high boiling residue consisting chiefly of methyl-α,β-dichloropropionate.

*Example XIX*

910 parts or trichlorethylene were mixed with 1940 parts of 98% sulphuric acid and 5 parts of cupric oxide and then reacted with 590 parts of 40% formalin as described in Example X. When reaction was complete the mixture was cooled below 100° C. 315 parts of water were added and the whole heated to 140° C. for 30 minutes. After again cooling the mixture, 446 parts of methanol were added, the mixture heated to 100° C. for an hour and the ester removed by steam distillation, 375 parts of crude neutral ester were obtained.

This invention is a valuable advance in the art as it reveals an economical and convenient way of making α-chloroacrylic acid and its derivatives either directly or by way of the chlorohydracrylic acid or α,β-chloropropionic acid. This α-chloracrylic acid and its derivatives can be polymerised to form resin-like bodies which can be moulded.

As many apparently widely different embodiments of this invention may be made without departing from the spirit and scope thereof, it is to be understood that the invention is not limited to the specific embodiments thereof, except as defined in the appended claims.

We claim:
1. The process comprising reacting a substance selected from the group consisting of formaldehyde and polymers thereof with trichlorethylene in the presence of sulphuric acid of at least 80% concentration and subsequently heating the resulting mixture in the presence of water.

2. The process comprising reacting 1 to 1½ mols of a substance selected from the group consisting of formaldehyde and polymers thereof with 1 mol of trichlorethylene in the presence of 1¼ to 4 mols of sulphuric acid of at least 80% concentration and subsequently heating the resulting mixture in the presence of water.

3. The process comprising reacting a substance selected from the group consisting of formaldehyde and polymers thereof with trichlorethylene in the presence of sulphuric acid of at least 80% concentration and of at least one mol of water for each mol of formaldehyde or polymer thereof employed and subsequently heating the resulting mixture in the presence of water.

4. The process comprising reacting a substance selected from the group consisting of formaldehyde and polymers thereof with trichlorethylene in the presence of sulphuric acid of at least 80% concentration and subsequently heating the resulting mixture in the presence of water under such conditions that at least 1 part by weight of water is present in said mixture for each 10 parts by weight of 100% sulphuric acid.

5. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture in the presence of water under such conditions that at least 1 part by weight of water is present in said mixture for each 10 parts by weight of 100% sulphuric acid.

6. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of at least 80° C. in the presence of water under such conditions that at least 1 part by weight of water is present in said mixture for each 10 parts by weight of 100% sulphuric acid.

7. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of at least 80° C. in the presence of water under such conditions that water is present in said mixture in an amount at least 1.5 times the weight of 100% sulphuric acid present therein.

8. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of at least 80° C. in the presence of water under such conditions that water is present in said mixture in an amount equal to from 2.0 to 2.5 times the weight of 100% sulphuric acid present therein.

9. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. under such conditions that water is present in an amount less than 1.5 times the weight of 100% sulphuric acid present therein.

10. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. under such conditions that water is present in an amount of from 0.1 to 1 times the weight of 100% sulphuric acid present therein.

11. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture in the presence of an alcohol and of an amount of water equal to at least 1 part by weight for each 10 parts by weight of 100% sulphuric acid present in said mixture.

12. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of at least 80° C. in the presence of an alcohol and of an amount of water equal to at least 1 part by weight for each 10 parts by weight of 100% sulphuric acid present in said mixture.

13. The process comprising reacting a substance selected from the group consisting of formaldehyde and polymers thereof with trichlorethylene in the presence of sulphuric acid of at least 80% concentration at a temperature between 30 to 100° C. and subsequently heating the resulting mixture at a temperature of at least 80° C. in the presence of an alcohol and water under such conditions that water is present in said mixture in an amount at least 1.5 times the weight of 100% sulphuric acid present therein.

14. The process comprising reacting a substance selected from the group consisting of formaldehyde and polymers thereof with trichlorethylene in the presence of sulphuric acid of at least 80% concentration at a temperature between 30 to 100° C. and subsequently heating the resulting mixture at a temperature of at least 80° C. in the presence of an alcohol and water under such conditions that water is present in said mixture in an amount equal to 2.0 to 2.5 times the weight of 100% sulphuric acid present therein.

15. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of an alcohol and water under such conditions that water is present in said mixture in an amount less than 1.5 times the weight of 100% sulphuric acid present therein.

16. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of an alcohol and water under such conditions that water is present in said mixture in an amount of from 0.1 to 1 times the weight of 100% sulphuric acid present therein.

17. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of methanol and an amount of water equal to less than 1.5 times the weight of 100% sulphuric acid present in said mixture, and separating methyl-α-chloracrylate.

18. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of methanol and an amount of water equal to from 0.1 to 1 times the weight of 100% sulphuric acid present therein, and separating methyl-α-chloracrylate.

19. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of ethyl alcohol and an amount of water equal to from 0.1 to 1 times the weight of 100% sulphuric acid present therein, and separating ethyl-α-chloracrylate.

20. The process comprising reacting a substance selected from the group consisting of formaldehyde and polymers thereof with trichlorethylene in the presence of sulphuric acid of at least 80% concentration at a temperature of 30 to 100° C. and subsequently heating the resulting mixture at a temperature of 120 to 160° C. in the presence of n-propyl alcohol and an amount of water equal to from 0.1 to 1 times the weight of 100% sulphuric acid present therein, and separating propyl-α-chloracrylate.

21. The process comprising reacting a substance selected from the group consisting of formaldehyde and polymers thereof with trichlorethylene in the presence of sulphuric acid of at least 80% concentration and subsequently heating the resulting mixture in the presence of a substance selected from the group consisting of water and alcohols.

22. The process comprising reacting a substance selected from the group consisting of formaldehyde and polymers thereof with trichlorethylene in the presence of sulphuric acid of at least 80% concentration and subsequently heating the resulting mixture in the presence of an amount of water equal to less than 1.5 times the weight of 100% sulphuric acid present therein.

23. The process comprising reacting a substance selected from the group consisting of formaldehyde and polymers thereof with trichlorethylene in the presence of sulphuric acid of at least 80% concentration and subsequently heating at a temperature of at least 80° C. the resulting mixture in the presence of an amount of water equal to 0.1 to 1 times the weight of 100% sulphuric acid present therein.

24. The process comprising reacting a substance selected from the group consisting of formaldehyde and polymers thereof with trichlorethylene in the presence of sulphuric acid of at least 80% concentration and subsequently heating the resulting mixture at a temperature of at least 80° C. in the presence of an alcohol and of an amount of water equal to 0.1 to 1 times the weight of 100% sulphuric acid present therein.

JOHN WILLIAM CROOM CRAWFORD.
NANCY McLEISH.